United States Patent
Woon et al.

(10) Patent No.: US 10,154,104 B2
(45) Date of Patent: *Dec. 11, 2018

(54) INTELLIGENT DELIVERY OF ACTIONABLE CONTENT

(71) Applicant: Microsoft Technology Licensing, LLC, Redmond, WA (US)

(72) Inventors: Clinton Chi-Wen Woon, Snoqualmie, WA (US); Kenneth Alan Lobb, Sammamish, WA (US); Andrew John Nuttall, Surrey (GB); Adam Paul Isgreen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,704

(22) Filed: Mar. 9, 2017

(65) Prior Publication Data

US 2017/0180498 A1    Jun. 22, 2017

Related U.S. Application Data

(63) Continuation of application No. 14/318,175, filed on Jun. 27, 2014, now Pat. No. 9,619,751.

(51) Int. Cl.
*G06F 17/00* (2006.01)
*H04L 29/08* (2006.01)
(Continued)

(52) U.S. Cl.
CPC ............... *H04L 67/22* (2013.01); *A63F 13/35* (2014.09); *A63F 13/45* (2014.09); *A63F 13/50* (2014.09);
(Continued)

(58) Field of Classification Search
None
See application file for complete search history.

(56) References Cited

U.S. PATENT DOCUMENTS 8,140,515 B2  3/2012 Pradhan et al.
8,311,983 B2  11/2012 Guzik
(Continued)

OTHER PUBLICATIONS

"How Game Creators are using the Power of Xbox One", Published on: Jul. 23, 2013, Available at: <<http://news.xbox.com/2013/07/xbox-one-game-creators-are-using-xbox-one>>, 5pp.
(Continued)

*Primary Examiner* — Ronald Laneau
(74) *Attorney, Agent, or Firm* — Klarquist Sparkman, LLP (57) ABSTRACT

Technologies are described herein for providing intelligent delivery of actionable content. Metadata that describes user activities at a computer system is analyzed to determine a need for actionable content. Actionable content is dynamically delivered to one or more client consoles when need for actionable content is presented. The actionable content may be presented in a number of forms, including links to, or the delivery of, video, text and/or image content. Actionable content may also include links or deliverable environments for enabling automatic engagement of a specific application scenario. The discovery and delivery of the actionable content may be improved by the use of one or more feedback mechanisms.

25 Claims, 6 Drawing Sheets

(51) Int. Cl.
*A63F 13/35* (2014.01)
*G06N 5/04* (2006.01)
*A63F 13/60* (2014.01)
*A63F 13/45* (2014.01)
*A63F 13/50* (2014.01)

(52) U.S. Cl.
CPC ............... *A63F 13/60* (2014.09); *G06N 5/04* (2013.01); *H04L 67/10* (2013.01); *H04L 67/306* (2013.01)

(56) References Cited

U.S. PATENT DOCUMENTS

| | | | |
|---|---|---|---|
| 8,316,031 B2 | 11/2012 | Ramer et al. | |
| 8,316,038 B2 | 11/2012 | Crawford | |
| 8,655,307 B1 | 2/2014 | Walker et al. | |
| 8,688,671 B2 | 4/2014 | Ramer et al. | |
| 8,880,499 B1 | 11/2014 | Wu | |
| 9,329,748 B1 | 5/2016 | Mitchell | |
| 9,338,622 B2 | 5/2016 | Bjontegard | |
| 9,386,354 B2 | 7/2016 | Archibong et al. | |
| 9,788,179 B1* | 10/2017 | Sharifi | H04W 4/18 |
| 9,798,708 B1* | 10/2017 | Sharifi | G06F 17/241 |
| 9,824,079 B1* | 11/2017 | Sharifi | G06F 17/241 |
| 2003/0182394 A1 | 9/2003 | Ryngler et al. | |
| 2004/0126038 A1 | 7/2004 | Aublant et al. | |
| 2005/0149395 A1 | 7/2005 | Henkin et al. | |
| 2005/0154996 A1 | 7/2005 | Othmer | |
| 2007/0294089 A1 | 12/2007 | Garbow et al. | |
| 2007/0300185 A1 | 12/2007 | Macbeth et al. | |
| 2008/0016502 A1* | 1/2008 | Henderson | G06F 17/30893 717/143 |
| 2008/0083003 A1 | 4/2008 | Biniak et al. | |
| 2008/0167133 A1 | 7/2008 | White et al. | |
| 2009/0131177 A1 | 5/2009 | Pearce | |
| 2009/0287646 A1 | 11/2009 | Maciocci | |
| 2010/0056275 A1 | 3/2010 | Wilson | |
| 2012/0100910 A1 | 4/2012 | Eichorn et al. | |
| 2013/0066448 A1 | 3/2013 | Alonso | |
| 2013/0260896 A1 | 10/2013 | Miura et al. | |
| 2015/0379407 A1 | 12/2015 | Woon et al. | |

OTHER PUBLICATIONS

PCT Search Report and Written Opinion dated Dec. 7, 2015 for PCT Application No. PCT/US15/37303, 16 pages.
Office Action for U.S. Appl. No. 14/318,175, dated Jun. 22, 2016, Woon et al., "Intelligent Delivery of Actionable Content", 11 pages.

* cited by examiner

FIG. 6 ns. Upon delivery of
INTELLIGENT DELIVERY OF ACTIONABLE CONTENT

This Application claims priority to and is a continuation of U.S. patent application Ser. No. 14/318,175, filed 27 Jun. 2017, entitled "Intelligent Delivery of Actionable Content," which is incorporated herein by reference.

BACKGROUND

Generally, users of social media websites, web-based video services, and other media-oriented services may record and upload media for sharing with one or more users. Some media may include content, such as video content, that is representative of a particular place, event, or other experience that other users may wish to also experience or research.

The uploaded media may be aggregated into relatively large libraries that are accessible through searches across all content via keywords and tags. These keywords and tags are typically created by a user uploading the media and, therefore, search results are likely to be returned based on use of the same keywords and tags. Consequently, the predictability of a particular piece of media being accessible by users not using the keywords or tags associated therewith may be small. Additionally, media that has not been accessed multiple times may lack sufficient ratings to be ranked highly within a listing of search results, which may further limit accessibility of any particular media file. In addition, existing systems may also be limited with respect to the delivery mechanisms for the requested media. Thus, interactions with existing systems may be limited in providing users with a fulfilling experience.

It is with respect to these and other considerations that the disclosure made herein is presented.

SUMMARY

Technologies are described herein for providing intelligent delivery of actionable content. In one embodiment, metadata that describes user activities at a computer system is analyzed to determine a need for actionable content. Actionable content is dynamically delivered to one or more client consoles when a need for actionable content is presented. The actionable content may be presented in a number of forms, including links to, or the delivery of, video, text and/or image content. Actionable content may also include links or deliverable environments for enabling automatic engagement of a specific application scenario.

According to various embodiments, the need for actionable content may be triggered by a manual request or by user activities that indicate a difficulty, inquiry or necessity for additional information. Actionable content may include a delivery mechanism for delivering media content or launching a video game or a gaming environment that is based on metadata interpreted from the user activities and other contextual data. For example, metadata may be generated by interpreting a user's participation in a chat board discussion. If the discussion includes an inquiry regarding a specific game scenario, e.g., a challenging level presented to a user with a particular inventory and skill level, such user activity may be interpreted and metadata describing aspects of the specific scenario may be generated. Based on the identification of the inquiry, actionable content is provided to the user. Actionable content can include links to a video uploaded to a website, links to access media related to a context of a user's activities, or more immersive examples such as links for launching users directly into a portion of a game, movie, or other environment. In one specific example, the actionable content launches a gaming application directly into the specific game scenario described in the discussion. In such an example, the interpreted metadata and contextual data from a number of resources, such as a user profile, may be used to launch the game application directly into the specific scenario.

According to various embodiments, actionable content may include the delivery of video, text and/or image content. The delivery of such content may be based on metadata interpreted from user activities and contextual data from other resources. For example, mechanisms presented herein may monitor the user's movement in a virtual world gaming environment. Techniques disclosed herein may determine a need for actionable content if a specific situation is presented within the environment. For example, a need for actionable content may be determined if the user's movement indicates the user is lost within the environment and their user profile indicates they are a novice user. Metadata describing the user's specific situation may then be used to search for the actionable content, which may include any form of media, such as a video that provides direction or assistance to the user.

According to various embodiments, the discovery and delivery of the actionable content may be improved by the use of one or more feedback mechanisms. Upon delivery of the actionable content, a user's activity may be monitored to determine if the actionable content influenced the user. In one embodiment, an outcome of the user's activities following access to the content is used to increase or decrease a ranking of the delivered content. Such feedback mechanisms increase the probability that other users engaged in similar activities in the future are presented with helpful content.

According to one embodiment presented herein, a computer-implemented method includes receiving one or more points of input associated with current activity at a computer, and determining a context based on the current activity and additional contextual data. The method further includes interpreting the context to determine a need for a delivery of additional information and interpreting the context to determine a type of delivery of additional information. If the need for the delivery of additional information is determined, the method includes generating actionable content configured to be invoked based on the context, wherein the actionable content is configured to accommodate the type of the delivery of additional information. The method also includes providing the actionable content to the computer.

According to another embodiment presented herein, a computer-readable storage medium has computer-executable instructions stored thereon which, when executed by a computer, cause the computer to collect information describing current activities at a computer and profile data, determine a need for presentation of additional information based on the profile data and the collected information. In addition, the instructions cause the computer to identify stored media associated with at least a portion of the current activities in response to determining the need, and provide a link to the identified stored media that facilitates the presentation of the identified stored media at the computer from a remote source.

According to yet another embodiment presented herein, a system includes at least one computing system providing a source of input, and at least one computing system executing a service configured to collect information from the source of input, the information being related to statistics in a video game, determine a need for presentation of additional information in response to the collected information, identify media associated with at least a portion of the video game based on the statistics in response to determining the need, present the identified media, determine if the presented media was useful, and increase a rank of the presented media for subsequent ranking and ordering of the presented media in response to determining the presented media was useful.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for intelligent delivery of actionable content, like deliverable environments such as gaming experiences. In addition, actionable content may include video content, audio content, and other media that may be generated or retrieved based on a need or desire of a user to experience the actionable content as determined through analysis of activities of the user. For example, a user traversing websites related to travel in a particular country might be presented with media associated with the country. In another example, users engaged in a particular portion of a video game may be presented with video content associated with completing that particular portion of the game or increasing player statistics in the video game.

Upon delivery of the actionable content, further activities may be analyzed to determine whether or not the actionable content was helpful. For example, if a user, subsequent to viewing or otherwise interacting with actionable content, such as a video, immediately passes a waypoint in a video game not previously surpassed, a rating or ranking of the actionable content, e.g., the video, may be increased or decreased in response to the user's further activities. Dynamic adjustment of the rating or ranking allow future users engaged in similar in-game activity may more easily locate the actionable content. The same technique may be applied to the travel scenario noted above by, for example, increasing a video ranking based on user reviews of locations related to the content of the video, based on user transactions or physical travel to the location, or other attributes.

Examples of actionable content include links to a video uploaded to a website, links to access media related to a context of a user's activities, or more immersive examples such as links for being launched directly into a portion of a game, movie, or other environment. Furthermore, the media itself can also be delivered, for example, through a video stream, audio stream, overlay of information, or by other presentation actions.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for intelligent delivery of actionable content will be described.

Figure 1:
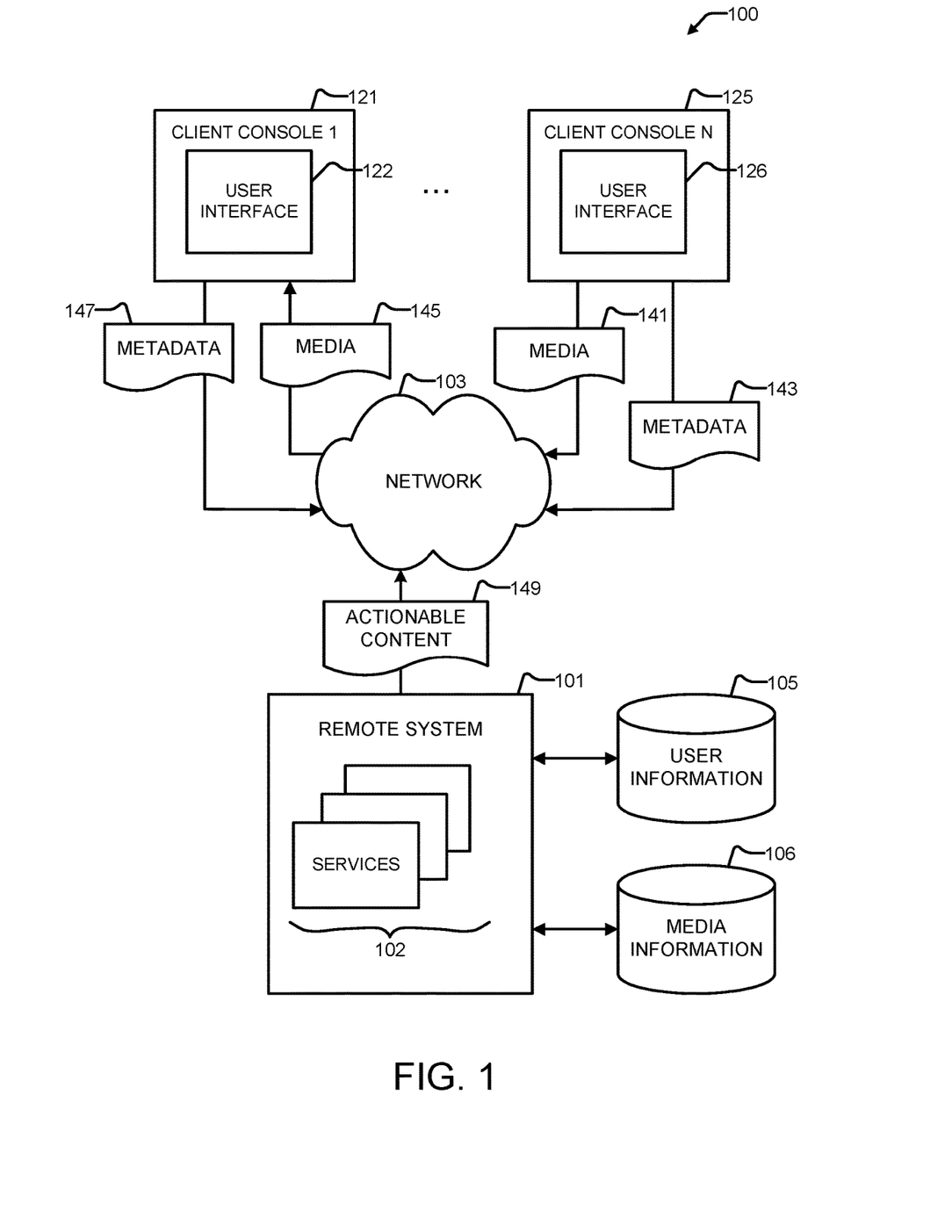
FIG. 1 is a network diagram showing aspects of an illustrative operating environment and several software components provided by the embodiments presented herein.

Turning now to FIG. 1, details will be provided regarding an illustrative operating environment and several software components provided by the embodiments presented herein. In particular, FIG. 1 shows aspects of a system 100 for intelligent delivery of actionable content. The system 100 includes a remote system 101. The remote system 101 may include any suitable server computer, or server computers, having hardware components configured to execute program modules and/or computer-executable instructions. For example, the remote system 101 may include a single dedicated computer server, a plurality of computer servers, or any combination of dedicated and plural computers configured to process information stored on or received across the network 103.

According to one embodiment, the remote system 101 is a remote gaming system configured to provide online gaming services to users. The remote system 101 may also include a video server, audio server, web server, or any suitable computer apparatus configured to execute software services. The remote system 101 may have software or program modules stored and executed thereon, such as, one or more services 102. The services 102 may include media services, gaming services, video hosting services, video ranking services, blog services, video blogging services, and/or other suitable software-implemented services executable by the remote system 101 through one or more program modules.

The system 100 may also be configured to store or access user information 105 by way of a suitable data store operatively connected to the remote system 101. The user information 105 may include user information, such as user profile data, computer usage data, data related to user interactions with a social media website, data related to user posts to message boards or newsfeeds, data related to user web-browsing activities, user blog text and audio, or any other suitable information. The user information 105 may further include video game information such as a pattern of play in a video game, game statistics, in-game locations of characters or avatars, in-game level information, in-game player ranking, in-game progress (overall progress and level-based progress), or other suitable information. This user information 105 may be stored as metadata accessible by the services 102 in one embodiment.

Generally, client consoles 121, 125 may be in communication with the remote system 101 over the network 103. The client consoles 121, 125 may include any suitable computer apparatus, including a gaming console, personal computer, laptop, tablet computing device, mobile device, smartphone, or the like, useable by a user wishing to access the remote system 101 or communicate with a user of the remote system 101. User interfaces 122, 126 may be rendered through the client consoles 121, 125, respectively, on display devices (not shown in FIG. 1) integrally arranged with the client consoles 121, 125 or in communication therewith.

According to one embodiment, a user of client console 125 may interact with the user interface 126 such that media 141 is generated. Media 141 may include video files related to the user's activities. For example, media 141 may include in-game recordings of a player traversing one or more portions of a video game. Alternatively, media 141 may include video recorded through a camera in communication with the client console 125, such as real life activities, physical motions of the user (e.g., in controlling the console through a recording device), photography of a particular geographic location, et cetera.

Metadata 143 might also be generated including, but not limited to, computer usage data, user profile data, data related to current activities, data related to user behavior, data related to user habits, user location data, in-game player activity data, in-game player behavior data, in-game player progress data, in-game player success data, in-game player failure data, or other information which may be related to the media 141. The metadata 143 may be in the form of a log or data file in some embodiments. The media 141 and metadata 143 may be transferred to one or more of the services 102 executing on the remote system 101 for further processing. The media 141 and metadata 143 might also be transmitted to another client console and/or the remote system 101 via network 103.

The services 102 may decipher the metadata 143 and select appropriate portions of the metadata to attach or associate with the media 141 for storage as media information 106. For example, if the media 141 includes an in-game video recording of a player traversing a particular portion of a video game, the services 102 may append the appropriate in-game location to metadata 143 corresponding to the media 141 for subsequent identification.

In this manner, other users traversing similar portions of a video game, or engaging in similar activities to those of the user of the client console 125, may be identified as potentially needing or desiring access to the media 141. For example, a user of the console 121 may interact with the user interface 122 such that metadata 147 is created. The metadata 147 may include similar information pertaining to the user of the client console 121. The metadata 147 may be transferred via network 103 and processed by service 102.

Upon processing, the services 102 may decipher the metadata 147 and determine that the user of console 121 is engaged in activities matching one or more media files previously stored in a data store containing media information 106. The services 102 may access and present the matching media 145 to the user through user interface 122 as actionable content 149.

According to one embodiment, the user of console 121 may launch a request (such as a "help" or "extra media" request) for media associated with the activity. Upon viewing the media 145, additional metadata associated with the user of console 121 may be processed to determine if the media 145 was helpful to the user. Depending upon the determination, a ranking or rating of the media 145 may be increased or decreased on behalf of the user, without further user input, such that a ranking of the media in future search results is increased. This may facilitate dissemination of useful media more so than unhelpful media, and may increase a user's enjoyment of the system 100.

As further shown in FIG. 1, the actionable content 149 may also be transferred from the remote system 101 to the consoles 121, 125. The actionable content 149 may include any of the metadata 143, 147 and media 141, 145 as streams of information for processing and presentation at user interfaces 122, 126. As noted above, the actionable content 149 may include delivered video content such as a link to a video uploaded to a web site, links to media related to a user's activities, etc.

In addition, actionable content 149 may include more immersive experiences, such as allowing a user to be launched directly into a portion of a game, movie, or other environment. The actionable content 149 may also include information overlays describing profile data of other users connected to the remote system 101, or any other suitable information. The information overlays may be rendered on a primary display device, secondary display device (such as a gaming handheld controller display), or the like. Accordingly, the actionable content 149 can take various forms which, when presented at client consoles 121, 125, provide additional information, metadata 143, 147, media 141, 145, or any other information retrieved from user information 105 or media information 106.

As described above, the system 100 may provide intelligent delivery of actionable content 149 to users of consoles 121, 125 through a user interface or through the use of other mechanisms. The system 100 may process information related to current activities and computer usage data described by metadata 143, 147 to determine whether media is available that is related to the user activities, and present the media to client consoles 121, 125 as actionable content 149 based on the context of the current activities.

Figure 2:
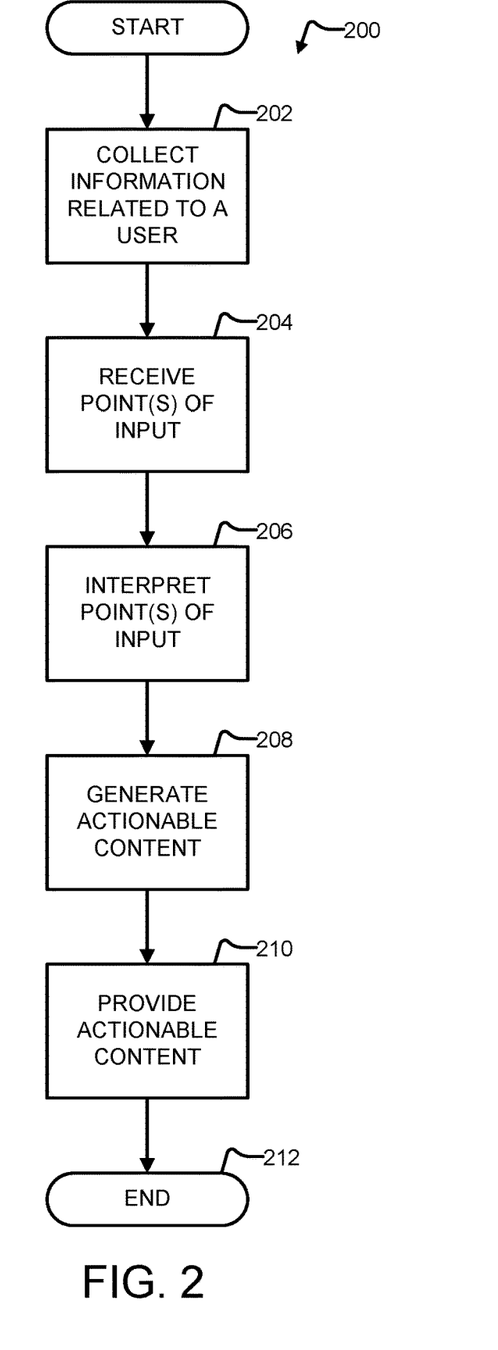
FIG. 2 is a flowchart showing aspects of one illustrative routine for intelligent delivery of actionable content, according to one embodiment presented herein.

FIG. 2 is a flowchart showing aspects of one illustrative routine 200 for intelligent delivery of actionable content that may be performed by the system 100, according to one embodiment presented herein. As shown in FIG. 2, the method 200 of intelligently delivering actionable content includes collecting information related to a user at block 202. The collected information may include metadata 143, 147 related to current activities on a computer system, computer usage data, profile data associated with the user or a user account, and other useful information. The current activities described by the metadata 143, 147 may aid in generating actionable content 149 to be experienced by the user based on the context of the current activities. The profile data may further aid in determining parameters associated with the actionable content, such as preferred methods of delivery (e.g., links, video, audio, etc.) or other useful parameters.

The method 200 further includes receiving one or more points of input at block 204. The points of input may include input from the Internet such as textual input from a blog, audio input (e.g., transcribed to text), instant messaging stream content, or other input. The points of input may further include input from a video game console, computer apparatus, or other device. Furthermore, the points of input can also include input from software sources such as a video game, web browser, or a software application. Other forms of input may also be applicable, and are within the scope of this disclosure.

Next, at block 206, the method 200 may further include interpreting the points of input to determine a need for a delivery of additional information or media. For example, the points of input may provide metadata describing current user activities, computer usage data, and additional contextual information. The additional contextual information can include user profile data or other contextual information. According to various embodiments, the need for additional information, e.g., a need for actionable content 149, may be triggered by a manual request or by user activities that indicate a difficulty, inquiry or necessity for additional information. As described in the examples below, metadata describing the interpretation of the points of input is used to determine the delivery mechanism for the actionable content 149.

In one illustrative example, the current user activities may include active blogging or discussions related to a particular scenario. For example, users of a blog may be actively discussing the video game TITANFALL and the in-game destruction of an armored vehicle. The discussions may be in any form, such as text or audio, and may include questions related to successful destruction of the armored vehicle. Accordingly, this activity may be reflective of a need for additional information related to successfully destroying the armored vehicle in TITANFALL.

Similarly, users may be engaged in an active conversation with a video game capable of receiving speech input. Such features enable users to provide commands to the game or communicate commands to other users. For example, a user may provide a number of speech commands to coordinate an attack within the video game, such as, repeated requests to arm a player with particular items or establish an effective point of attack. Accordingly, this activity may be reflective of a need for additional information related to successfully completing the task. As can be appreciated, the identification of a need for additional information may be based on the user's input and/or other contextual information from a number of resources, such as the user's profile.

Other examples of current activities include, but are not limited to, instant messaging, blogging, emailing, chatting, playing a video game, or any other suitable activity. Each of these activities may be analyzed by the services 104 to determine a need for delivery of additional information at block 206. The activities may be further analyzed to determine a type of the delivery of the additional information at block 206.

The type of the delivery may be based on the interpretation of the current activities, and may be tailored based on the context identified from the points of input. For example, continuing the TITANFALL example discussed above, the need for additional information related to successfully destroying the armored vehicle can be interpreted to determine that the users of the blog need guidance in the form of a video or a guided example. Thus, the type of delivery can include a link for playing a video of a previously recorded successful attack on the armored vehicle stored in media information 106.

In another example, the type of delivery can include a more immersive experience, such as a program module or link for launching one or more users into a particular game scenario. In such an example, the program module or link may be configured to launch one or more users into a specific game scenario based on the need that is interpreted from the current activities. For example, the program module or link launching the game scenario may include users who have not successfully accomplished completion of the waypoint. In addition, the program module or link launching the game scenario may include the user blogging about successful completion of the same goal. Launching both types of users into a specific game scenario, e.g., the scene immediately preceding engagement with the armored vehicle, the previously successful user can directly demonstrate the actions necessary to complete the waypoint. Still further, the actionable content 149 may include a playback of a video recording of a successful player, such that inexperienced users can see and experience completion of the waypoint from another perspective. Other forms of the type of delivery may also be applicable, and are within the scope of this disclosure.

Subsequent to determining the need for delivery and the type of delivery, the method 200 includes generating the actionable content 149 at block 208 and providing the actionable content 149 to client consoles 121, 125 at block 210. The actionable content 149 can be automatically invoked at the consoles 121, 125, and is based on the interpretation at block 206. Generally, the actionable content 149 includes any of the examples listed above that can be executed by the consoles 121, 125 through user interfaces 122, 126, respectively. For example, if the type of delivery includes playback of video, the actionable content 149 can include instructions configured to execute on a computer apparatus and direct the computer apparatus to render the video. If the type of delivery includes launching of a game, the actionable content 149 can include instructions configured to execute on a computer apparatus and direct the computer apparatus to launch the game according to the collected metadata (including for example a game waypoint or other gaming information) and the profile data (including for example a character level, skill, items, etc.). These instructions can be in the form of a selectable link delivered to a computer according to some embodiments. The method 200 ceases at block 212, or can continually iterate by collecting additional metadata, profile data, and other information, and generating and providing actionable content 149 according to the interpretation at block 206.

As described above, intelligent delivery of actionable content includes collecting metadata describing current activities, computer usage data, and profile data, with subsequent generation and delivery of actionable content 149 based on a context of the current activities at client consoles 121, 125. Further examples including types of actionable content and determinations of the helpfulness of presented actionable content are described below with reference to FIGS. 3-5. It should be understood that although these examples are described within the context of video, audio, and video game content related to current activities, the same might be configured in any suitable manner to be applicable to any form of actionable content.

Figure 3:
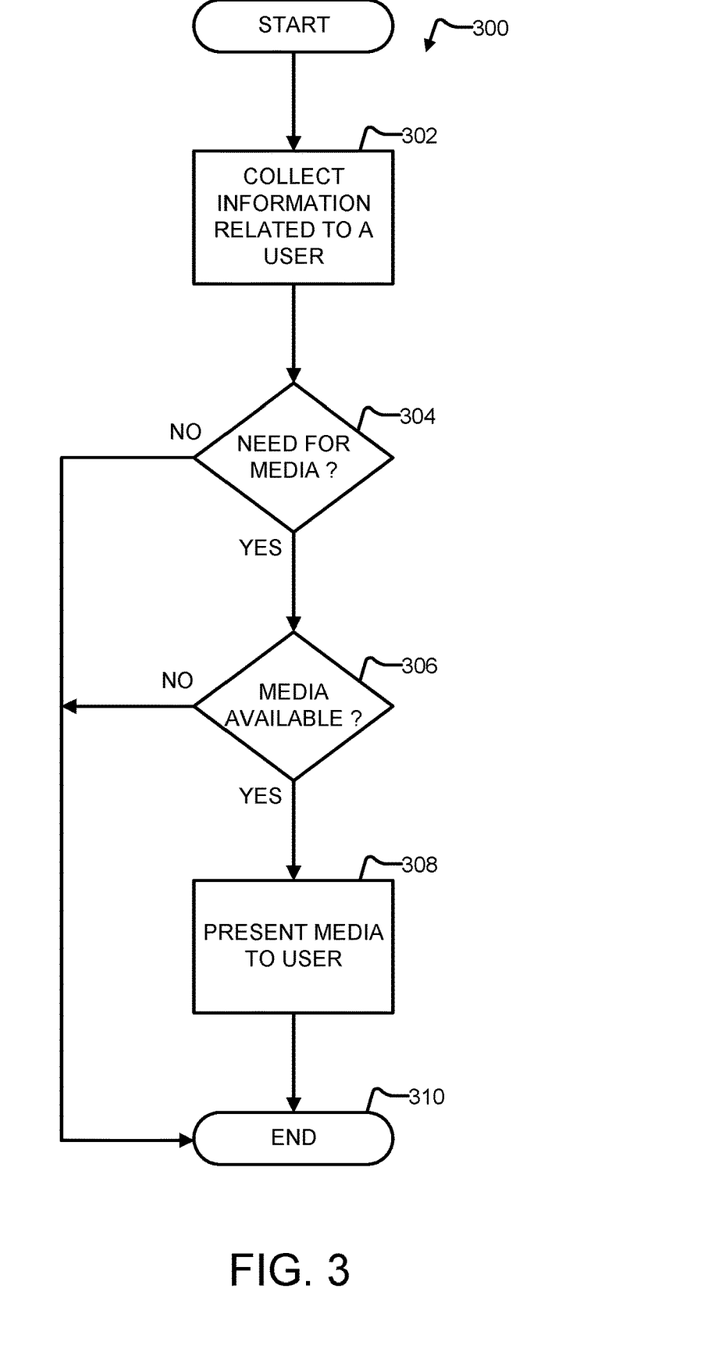
FIG. 3 is a flowchart showing aspects of one illustrative routine for intelligent delivery of actionable content and presentation of media, according to one embodiment presented herein.

Turning now to FIG. 3, a flowchart showing aspects of an illustrative routine 300 for intelligent delivery of actionable content and presentation of media (which may be performed by the system 100) is illustrated according to one embodiment presented herein. As shown in FIG. 3, the method 300 of intelligently delivering actionable content includes collecting information related to a user at block 302. The information gathered may include metadata 143, 147 related to user activities on a computer system, such as the client consoles 121, 125, computer usage data, user profile data, additional contextual information and any other useful information. The metadata 143, 147 may aid in identifying media that may be useful to the user.

The method 300 further includes determining a need for presentation of media at block 304. The determination may be facilitated by a direct request through selection of a camera icon, help icon, or other graphical user interface element. The request may be indicative of a need to be presented information. Alternatively, the determination may be based on a pause in user activity, back-and-forth or repeated interaction with the same or similar interface elements, or other activity indicative of confusion or trouble making a decision. Accordingly, the determination for a need for presentation of media may be based on a context or scenario that is interpreted to extrapolate information, as described below.

The context or scenario may include one or more factors that can be used to compile a "need score" that can be compared to a threshold indicating need for presentation of media. If the need score is above the threshold, it is determined that a need for the presentation of media exists. Generally, the need score may be a numerical value based on the one or more factors. For example, the one or more factors can include the direct request by the user. The request may be a general request for help in some embodiments. In another embodiment, the request can be accompanied by text, such as, for example, a question or statement related to a scenario. The text can be retrieved from a blog, instant messaging stream, or transcribed audio in some embodiments. In such embodiments, the statement or question is analyzed, and contextual data is generated based on the statement or question. The contextual data is then used to increase or decrease the need score.

The one or more factors can also include current activity or computer usage information. For example, in a video game scenario, numbers and/or values can be maintained to track or characterize current activity, which may include a number of attempts at a particular challenge (or a number of failures), particular items a game player has stored in an in-game inventory, user profile data (e.g., what level has been achieved), or other such activity and/or information. These numbers and/or values can be evaluated and used to increase or decrease the need score. Upon aggregation of the need score, the need score is compared to the threshold described above, and the determination may be completed.

Next, at block 306, the method 300 further includes determining if the system 100 contains media that is associated with the collected information. The determination at block 306 may include extrapolating trends or analytical data from the metadata to determine a preference of the user, or a context of the current activities. For example, if a user is engaged in web browsing related to visiting a particular country or training for a physical event, the determination may include locating media files associated with the particular country or event training. Similarly, if the user is engaged in blogging or discussions related to a portion of a video game, the determination might include locating media files associated with the portion of the video game. Additionally, if the user is actively playing back an audio track associated with a movie, video game, or video, the same may be identified through the determining access the associated media. The media identified may include video files or a video game scenario according to one embodiment.

The method 300 further includes presenting available media to the user at block 308. For example, if media is available which is associated with the extrapolated data, this media may appear on a user interface rendering for use by the user. An in-browser video or other similar element may be rendered and presented to the user. Furthermore, a link to the identified media may be provided. The link may enable playback of a video file, launching of the video game scenario, or other such presentation actions. Still further, emails can be generated and sent to the user including the links, social media posts may be generated including the links, or other communications may be likewise generated. Even further, information overlays including the media can be launched or provided at the user's computer. The information overlays can be superimposed onto a display apparatus that include information associated with the identified media, information related to other users in a video game (e.g., other characters, skill levels, achievements, etc.), and other types of information.

Upon, during, or subsequent to presentation to the user, data regarding further activities may be processed to determine the helpfulness of the media. For example, if a user immediately acts upon purchasing a ticket to the particular country, or orders items associated with training for the event, the media may be determined as being helpful. Finally, upon presentation to the user and any further processing of additional user activities, the method concludes at block 310. As described above and according to some embodiments, media and actionable content may be related to video games, and may be suitable to aid users of video games to succeed in a manner not previously attained.

Figure 4:
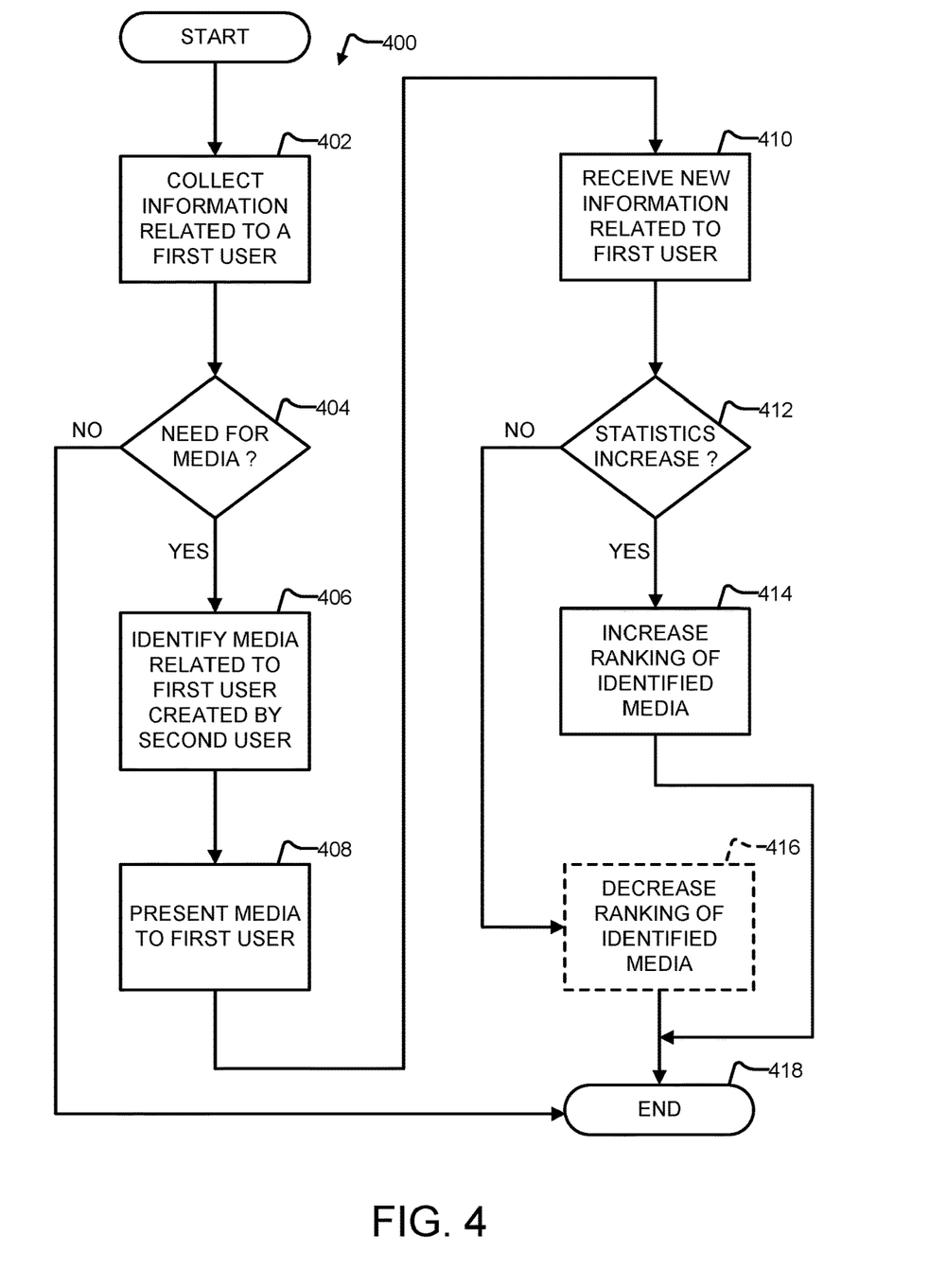
FIG. 4 is a flowchart showing aspects of one illustrative routine for intelligent delivery of actionable content and presentation of media for users of a video game, according to one embodiment disclosed herein.

FIG. 4 is a flowchart showing aspects of one illustrative routine 400 for intelligent delivery of actionable content and presentation of media for users of a video game, according to one embodiment presented herein. As shown in FIG. 4, the method 400 includes collecting information related to a first user at block 402. The information gathered may include metadata as described above related to current activities on a computer or gaming system. These activities may aid in identifying media that may be useful to the user. The information may include a pattern of play, in-game location, progress, action, player statistics, behavior, success, and failure.

The method 400 further includes determining if the first user needs additional information (e.g., actionable content 149) at block 404. The determination may be facilitated through a user requesting in-game help by selecting an icon or other action. The determination may also be facilitated through detection that a user is having difficulty progressing through a portion of the video game or if a predetermined amount of time has elapsed in a gaming scenario. Furthermore, the determination may be facilitated through comparison of the need score to a threshold, as described above, including analysis of the one or more factors also described above.

The method 400 further includes identifying media related to the first user but created by a second user at block 406. If the first user needs to access additional information as determined above, the identification may include extrapolating characteristics from the gathered information to aid in comparing to metadata associated with stored media 106. The metadata may include information related to in-game waypoints, levels, or the like.

The method 400 further includes presenting the identified media to the first user at block 408. The presentation may include playing a video file for the user, auto-game play or automatic guidance of a character/avatar through a particular level according to the identified media, or any other presentation action.

The method 400 further includes receiving new information related to the first user at block 410, subsequent to presentation (e.g., viewing) of the media by the first user. The new information may be similar to the collected information, and may include updated gaming information related to the user's progress after being presented the media.

The method 400 at block 412 further includes determining if in-game statistics of the first user increased or improved due to presentation of the media. For example, the new information may be analyzed and compared to the initially collected information to determine any improvements. If the in-game statistics have improved, the method 400 includes increasing the ranking or rating of the identified media at block 414.

If the in-game statistics have not improved, the method 400 includes decreasing the ranking or rating of the identified media at block 416. It is noted that according to some embodiments, block 416 is optional. Upon processing of the above, the method 400 concludes at block 418. According to one embodiment, particular portions or waypoints of a video game may also be considered directly to determine if a user should be presented media associated with the particular portion or waypoint, for example, if difficultly in progression in-game is detected, which is described in more detail with regard to FIG. 5.

Figure 5:
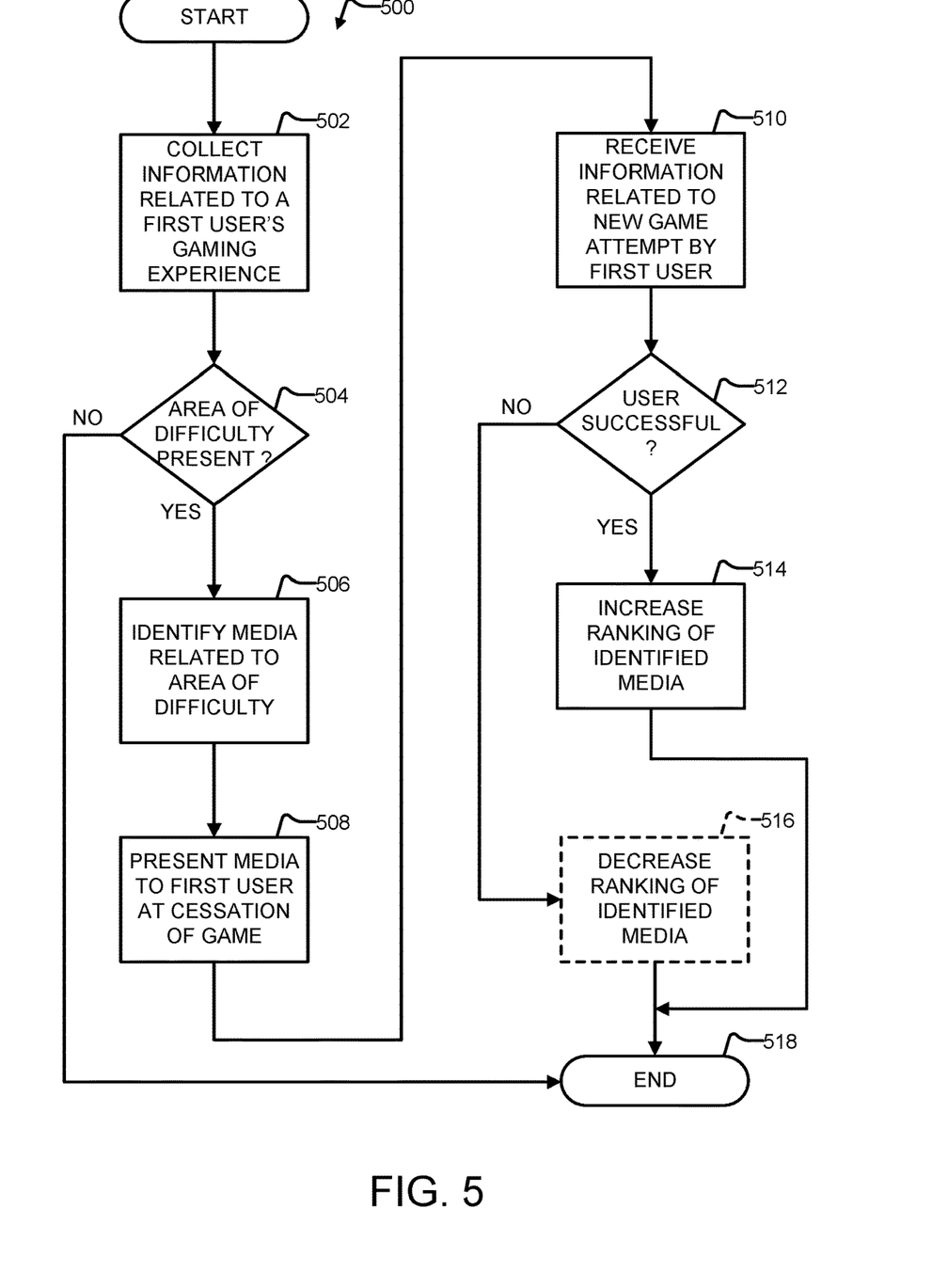
FIG. 5 is a flowchart showing aspects of one illustrative routine for intelligent delivery of actionable content based on an area of difficulty identified in a video game, according to one embodiment disclosed herein.

FIG. 5 is a flowchart showing aspects of one illustrative routine 500 for intelligent delivery of actionable content based on an area of difficulty identified in a video game, according to one embodiment disclosed herein. As shown in FIG. 5, the method 500 includes gathering information related to a first user's gaming experience at block 502. The information gathered may include metadata as described above related to current activities on a computer system. These activities may aid in identifying media that may be useful to the user. The information may include a pattern of play, in-game location, progress, action, player statistics, behavior, success, and failure.

The method 500 further includes determining if the first user has experienced an area of difficulty at block 504. For example, the determining may include analyzing the collected data to determine if the user's in-game statistics are average, sub-average, or minimal compared to a number of users of the video game. These statistics may be indicative of the user having difficulty in the video game. Other aspects to aid in the determination may include amount of time to complete or pass a waypoint, points or score at a waypoint, items gathered, or other suitable aspects or measurements from a video game, including aggregation of the need score described above.

The method 500 further includes identifying media associated with the area of difficulty at block 506. The identification may include comparing the area of difficulty to metadata associated with stored videos or stored recordings of gameplay to determine if any stored media matches or is related to the area of difficulty. For example, videos matching a difficult scenario may include metadata identifying a particular waypoint, level, item, or other video game attribute.

The method 500 further includes presenting the identified media to the first user upon cessation of the gaming experience at block 508. The presentation may be facilitated in any manner described above, including playing back a video through the gaming system, immersing the first user in guided gameplay recorded in the media, or through any suitable presentation action.

The method 500 further includes receiving information related to a new gaming attempt by the first user at block 510. For example, upon viewing the media presentation, the user may re-attempt the area of difficulty. New information and statistics related to this attempt may be gathered as described above.

The method 500 further includes determining if the first user was more successful in the previously identified area of difficulty at block 512. Upon gathering of the new information related to the new attempt, the new information may be compared to previous attempts at the area of difficulty by the user. If the first user was more successful in the new attempt, the method 500 includes increasing the ranking or rating of the identified media at block 514.

If the first user was not successful in the new attempt at the previously identified area of difficulty, the method 500 includes decreasing the ranking or rating of the identified media at block 516. It is noted that according to some embodiments, block 516 is optional. Upon processing of the above, the method 500 concludes at block 518.

As can be appreciated, the above-described examples and applications are provided for illustrative purposes and are not to be construed as limiting. The techniques described herein may apply to a wide range of applications, mediums, and uses. For example, users of the system 100 may see a movie they like, and indicate a desire to flag a particular scene. Media or sections of media may be flagged by the use of a device displaying the movie. Alternatively, media may be flagged by a user entering metadata, e.g., by text or speech input, into a device. Once the media is flagged, the system 100 may automatically or dynamically recall the media when a need is presented. Other applications such as online retail items and online auctioning may use the intelligent delivery of the actionable content.

It should be appreciated that the logical operations described above may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 6:
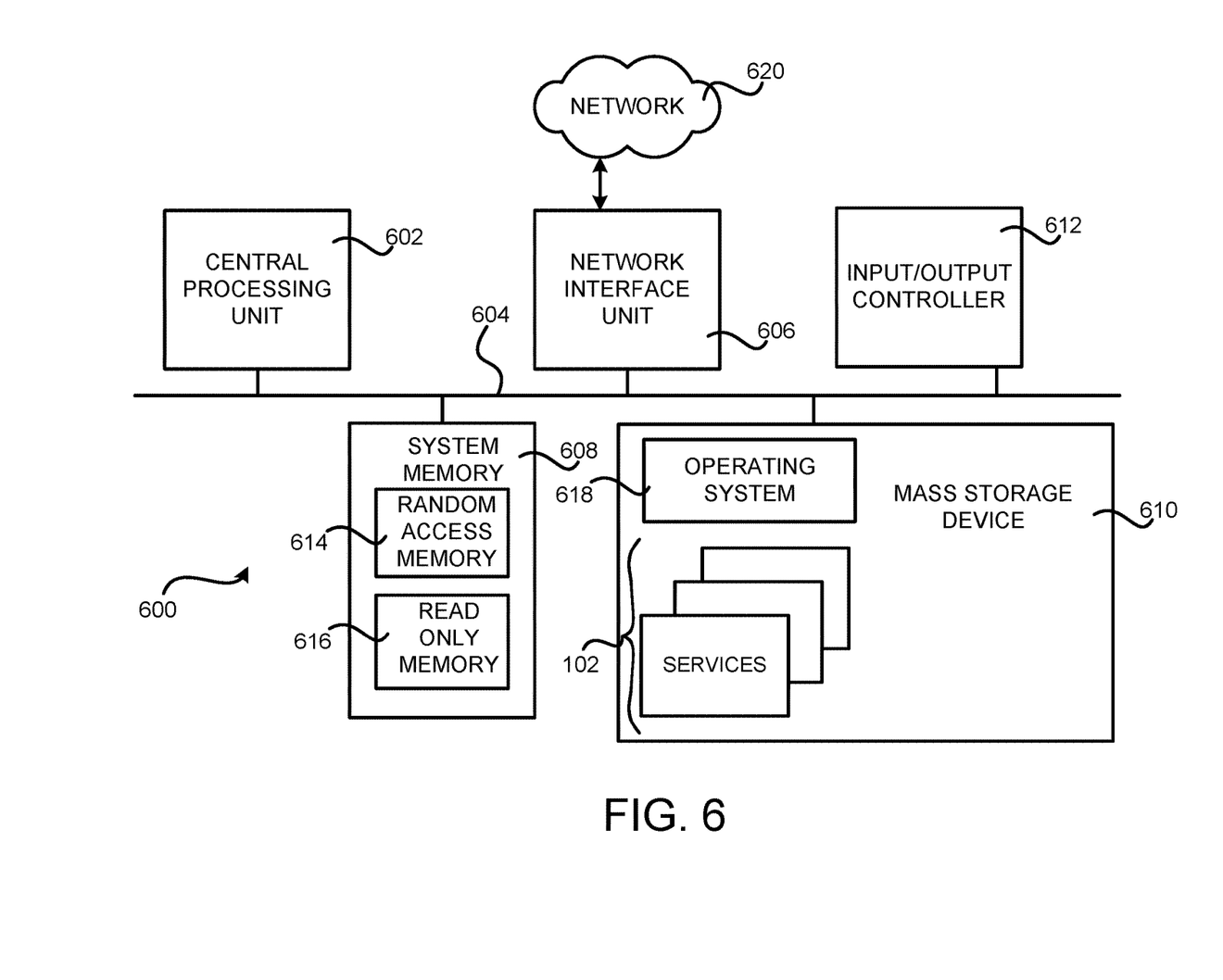
FIG. 6 is a computer architecture diagram showing an illustrative computer hardware and software architecture for a computing system capable of implementing aspects of the embodiments presented herein.

FIG. 6 shows an illustrative computer architecture for a computer 600 capable of executing the software components described herein for intelligent delivery of the actionable content in the manners presented above. The computer architecture shown in FIG. 6 illustrates a conventional desktop, laptop, or server computer and may be utilized to execute any aspects of the software components presented herein described as executing on the client consoles 121, 125 or the remote system 101.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se and/or communication media.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules, such as modules configured to provide the services 102, described above. The mass storage device 610 and the RAM 614 may also store other types of program modules and data, such as the user information 105 and media information 106.

Based on the foregoing, it should be appreciated that technologies for intelligent delivery of actionable content are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method comprising:
collecting information describing a current activity at a computing device;
determining a context based at least in part on the current activity;
determining that a delivery of additional information is needed based at least in part on the determined context;
generating actionable content based at least in part on the determined context and the collected information describing the current activity in response to determining that a delivery of additional information is needed; and
providing the actionable content to the computing device.

2. The method of claim 1, wherein the actionable content comprises one or more links to at least one of video, text, or image content.

3. The method of claim 1, wherein the actionable content comprises information about a location.

4. The method of claim 1, wherein the collected information comprises user location data.

5. The method of claim 1, wherein the collected information comprises data related to user web browsing activities.

6. The method of claim 1, further comprising determining a type of delivery of the actionable content to the computing device based at least in part on the collected information comprising user profile data.

7. The method of claim 1, wherein determining that the delivery of the additional information is needed comprises at least one of receiving a direct request from a user of the computing device or determining that the current activity indicates an inquiry for the additional information based at least in part on the determined context.

8. A system comprising:
memory;
one or more processors coupled to the memory to perform acts comprising:
collecting information describing a current activity at a computing device;
determining a context based at least in part on the current activity;
determining that a delivery of additional information is needed based at least in part on the determined context;
generating actionable content based at least in part on the determined context and the collected information describing the current activity in response to determining that a delivery of additional information is needed; and
providing the actionable content to the computing device.

9. The system of claim 8, wherein the actionable content comprises at least one of video, text, or image content.

10. The system of claim 8, wherein the actionable content comprises information about a location.

11. The system of claim 8, wherein the collected information comprises user location data.

12. The system of claim 8, wherein the collected information comprises data related to user web browsing activities.

13. The system of claim 8, the acts further comprising determining a type of delivery of the actionable content to the computing device based at least in part on the collected information comprising user profile data.

14. The system of claim 8, wherein determining that the delivery of the additional information is needed comprises receiving a direct request from a user of the computing device.

15. One or more non-transitory computer storage media storing executable instructions that, when executed by one or more processors, cause the one or more processors to perform acts comprising:
collecting information describing a current activity at a computing device;
determining a context based at least in part on the current activity;
determining that a delivery of additional information is needed based at least in part on the determined context;
generating actionable content based at least in part on the determined context and the collected information describing the current activity in response to determining that a delivery of additional information is needed; and
providing the actionable content to the computing device.

16. The one or more computer storage media of claim 15, wherein the actionable content comprises one or more links to at least one of video, text, or image content.

17. The one or more computer storage media of claim 15, wherein the actionable content comprises information about a location.

18. The one or more computer storage media of claim 15, wherein the collected information comprises at least one of user location data or data related to user web browsing activities.

19. The one or more computer storage media of claim 15, the acts further comprising determining a type of delivery of the actionable content to the computing device based at least in part on the collected information comprising user profile data.

20. The one or more computer storage media of claim 15, wherein determining that the delivery of the additional information is needed comprises determining that the current activity indicates an inquiry for the additional information based at least in part on the determined context.

21. A method comprising:
receiving a first user input at a computing device, the first user input indicating a need for additional information;
responsive to the first user input, collecting information at a computing device based on a current activity to determine a context;
determining that a retrieval of additional information is needed, where the additional information is based at least in part on the determined context;
retrieving one or more actionable content based at least in part on the determined context and the collected information describing the current activity;
providing the one or more actionable content to the user;
receiving a second user input indicating a selection of one of the one or more actionable content; and
launching a program module based on the selection of one of the one or more actionable content.

22. The method of claim 21, wherein the actionable content comprises one or more links to at least one of video, text, or image content.

23. The method of claim 21, wherein the actionable content comprises information about a location.

24. The method of claim 21, wherein the collected information comprises user location data.

25. The method of claim 21, wherein the collected information comprises data related to user web browsing activities.

* * * * *